United States Patent [19]

Stephens

[11] 3,991,632
[45] Nov. 16, 1976

[54] LINK DRIVING BELTS
[75] Inventor: Edward Hargreaves Stephens, Tanworth in Arden, England
[73] Assignee: Fearnhill Engineering Co. Ltd., Solihull, England
[22] Filed: May 7, 1975
[21] Appl. No.: 575,417

[52] U.S. Cl. .................................................. 74/235
[51] Int. Cl.² ........................................... F16G 1/00
[58] Field of Search ................. 74/231 P, 236, 235, 74/250 R

[56] References Cited
UNITED STATES PATENTS

| 216,533 | 6/1879 | Rumpp | 74/235 X |
|---|---|---|---|
| 765,819 | 7/1904 | Cutter | 74/236 |
| 1,085,029 | 1/1914 | Dupuis | 74/236 X |
| 1,490,037 | 4/1924 | Shideed | 74/235 |
| 2,627,756 | 2/1953 | Bendall | 74/236 X |
| 2,756,604 | 7/1956 | Wiker, Jr. | 74/236 X |
| 3,792,621 | 2/1974 | Smith | 74/231 P X |

FOREIGN PATENTS OR APPLICATIONS

| 879,298 | 10/1961 | United Kingdom | 74/236 |

Primary Examiner—Leonard H. Gerin
Attorney, Agent, or Firm—Olson, Trexler, Wolters, Bushnell & Fosse, Ltd.

[57] ABSTRACT

A link belt having a plurality of interconnected links, each of which has anti friction material so arranged that it intervenes between adjacent contacting link surfaces.

4 Claims, 3 Drawing Figures

LINK DRIVING BELTS

This invention relates to driving belts for use with V-pulleys and of the kind made up from a number of links joined together to form a continuous band. Such belts are made in such a way that adjacent links overlap. In some cases, moreover, there are more than two links overlapping at certain points on the belt. When the belt is bent, for instance, as it passes over a pulley, there is some relative movement between the links lengthwise of the belt. In known belts this causes friction, and creates heat and thus absorption of power.

The object of this invention is to provide a link belt which is efficient in operation and in which power absorption during flexing of the belt, and the creation of heat is minimised.

According to the present invention a link belt is characterised by anti-friction material between adjacent faces of the links in contact with one another.

Figure 1:
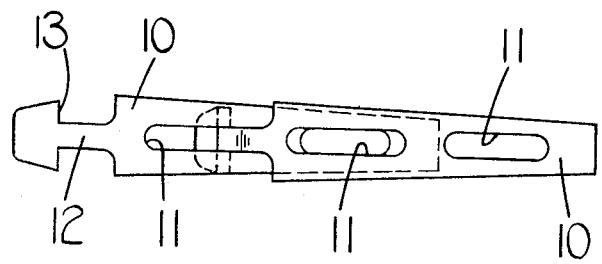
Figure 2:
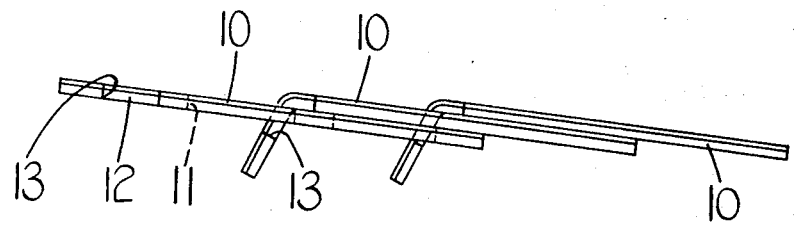
Figure 3:
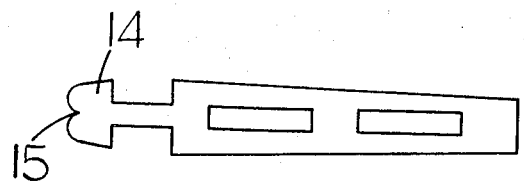

The invention will now be described by way of example with reference to the accompanying drawings in which FIG. 1 is a plan view of two links of a belt constructed in accordance with the invention, FIG. 2 is a side elevation view and FIG. 3 is an alternative form of link also in accordance with the invention.

The links in FIGS. 1 and 2 each identified at 10, are identical and a plurality of them make up a complete endless belt. Each link is a laminated strip having at least one layer of a material such as nylon which has sufficient strength to withstand the tension loads applied on the belt in use without undue stretching and at least one layer of a material affording frictional engagement with the sides of a V-pulley in which the belt runs, such material being for example rubber or a rubber like plastics material. The layers are bonded together with the edges of the rubber being preferably slightly proud of the layer of nylon so that principal engagement between each link and the V-pulley takes place through the edges of the rubber layer. Each link is formed with two oblong openings 11 which are aligned and spaced from one another lengthwise of the link. At one end of the link, two cut outs are formed to define a neck 12 flanked by a pair of co-planar shoulders 13.

The neck 12 has a width equal to that of the openings 11. Adjacent links are joined together by passing the necked end of one link into a slot in the next link. It is possible for the links to be joined by engaging the necked end of a link into either of the two openings 11 in the adjacent link. If the arrangement which is illustrated in FIGS. 1 and 2 is adopted, the next link to the right of those shown will have its necked end passed through the centre one of the three openings 11 illustrated in the drawings so that three layers of link material alternate with two layers along the length of the belt. If however, the link on the right is engaged with the outermost of openings 11, (not as illustrated) there will be two layers of link material alternating with one, throughout the length of the belt.

Clearly the strength of the belt and the driving force which can be transmitted varies in accordance with the connection arrangement adopted.

Between adjacent layers of the links there are inserts which are identical in shape to the links themselves but which are formed from a material having low co-efficient of friction properties. Preferably a material such as polytetrafluroethylene is used. The insert can be separate from the links or can be bonded to one or both of the surfaces, preferably the top surface of each one of the links. Such low friction material can be applied directly onto the links by spraying or other technique, to form a film of the material on the surface of the links.

The low friction material reduces the frictional losses resulting from bending of the belt, for example, around a V-pulley and significantly reduces the power absorption due to such friction, and heat.

The necked ends of the links terminate in heads which are shaped to engage in the V-pulley for which the belt is designed and the sides of such head form frictional surfaces assisting the transmission of power by the belt.

In the construction shown in FIG. 3, a link is shown in which the head 14 is split at 15 to allow some compression of the head due to wear in the pulley or alternatively when pulleys of different groove angles are used.

In an alternative construction, the low friction material is formed by the nylon which constitutes the tensile strength transmitting element of each link. In such construction, there is a layer of rubber or rubber like plastics material on top of which is a layer of the nylon which also serves as the low friction material. More than one ply may be in each layer.

The invention can also be applied to link belts wherein the links are connected by rivets.

In a still further alternative some of the links may be of one material while the remainder are of another. In this arrangement improvements in the frictional properties for driving purposes can be obtained in some circumstances. Alternate links of different materials may for example be adopted.

The links may be of different shape from these shown and one two or three openings may be provided for inter engagement of the necked ends of the links.

I claim:

1. A belt comprising a plurality of separate links connected together through integral interlocking formations, and anti-friction material located between adjacent faces of the links which are in contact with one another.

2. A link belt as claimed in claim 1, in which the anti-friction material is in the form of a separate plastic insert located between respective links.

3. A belt as claimed in claim 1, in which the antifriction material is a layer of plastics material applied to a face of each link presented to an adjacent link.

4. A belt comprising a plurality of separate links each having an enlarged head, a reduced neck and a body defining an aperture to accept the neck of an adjacent link, thereby providing integral interlocking formations connecting the separate links to one another in at least partly overlapping relationship, each link including at least one layer of tensile load-bearing material and at least one layer of antifriction material located between the overlapping load-bearing material of adjacent links to reduce inter-link belt working friction, the anti-friction layer having a shape identical to the shape of the load-bearing material but having anti-friction edges extending proud of the load-bearing material so that principle engagement between each link and a pulley takes place through the proud edges of the anti-friction material.

* * * * *